United States Patent [19]

Nagashima

[11] 4,376,459
[45] Mar. 15, 1983

[54] HEAT EXCHANGER

[75] Inventor: Masaru Nagashima, Saitama, Japan

[73] Assignee: Diesel Kiki Co., Ltd., Tokyo, Japan

[21] Appl. No.: 110,330

[22] Filed: Jan. 7, 1980

[30] Foreign Application Priority Data

Jan. 30, 1979 [JP] Japan .......................... 54-10181[U]

[51] Int. Cl.³ .......................................... F28F 27/00
[52] U.S. Cl. ............................... 165/96; 137/625.31
[58] Field of Search ......................... 165/96, 129–131, 165/53–55; 251/208; 137/625.31

[56] References Cited

U.S. PATENT DOCUMENTS

| | | | |
|---|---|---|---|
| 880,127 | 2/1908 | Cramer ......................... | 137/625.31 |
| 881,228 | 3/1908 | Dyblie ......................... | 137/625.31 X |
| 1,751,591 | 3/1930 | McCloskey ..................... | 251/208 |
| 1,846,698 | 2/1932 | Trone ......................... | 105/129 |

FOREIGN PATENT DOCUMENTS

| | | |
|---|---|---|
| 236101 | 4/1959 | Australia . |
| 278108 | 8/1963 | Australia . |
| 257169 | 12/1963 | Australia . |
| 279100 | 4/1966 | Australia . |
| 36577 | 6/1973 | Australia . |
| 21287 | 1/1906 | Sweden ..................... 137/625.31 |

Primary Examiner—William R. Cline
Assistant Examiner—Theophil W. Streule, Jr.
Attorney, Agent, or Firm—Frishauf, Holtz, Goodman & Woodward

[57] ABSTRACT

A heat exchanger, intended for use in hot water heaters, in which a tank and a hot water inlet pipe are formed integrally with each other, at a junction of which is placed a valve for control of the flow rate of hot water. The valve has a valve body disposed in close contact with a valve seat for rotation about its own axis relative thereto. Secured to the valve body is a rotary shaft which can be operated from outside. The valve body and the valve seat have respective through holes formed therein which can register with each other with their registered area variable to vary the flow rate of hot water with a change in the registered area of these through holes. The valve body is adapted to be placed in tight contact with the valve seat substantially solely by the pressure of hot water in the inlet pipe.

4 Claims, 6 Drawing Figures

HEAT EXCHANGER

BACKGROUND OF THE INVENTION

The present invention relates to a heat exchanger, and particularly provides a heat exchanger adapted for use in hot water heaters, which is provided with a valve for control of the flow rate of a thermal medium fluid such as hot water.

In a conventional type hot water heater used in a motor vehicle for instance, a heat exchanger (heater core) is connected by means of a pipe with a water pump mounted on the engine of the vehicle. Hot water is pumped by the water pump and fed through the pipe from the engine to the heat exchanger. The hot water is then cooled by the heat exchanger and is returned to the water pump by way of another pipe.

A heat exchanger of this kind is disclosed e.g., in U.S. patent application Ser. No. 064,750, now U.S. Pat. No. 4,266,604, issued May 12, 1981, assigned to the assignee of the present application, in which two tanks, each composed of tank elements molded from a synthetic resin material and combined together, are joined to either side of a heat exchanger matrix which comprises hot water tubes and radiating fins.

According to conventional type heat exchangers of this kind including this disclosed type, usually a flow control valve is mounted in a hot water inlet pipe connected to the heat exchanger matrix at an inlet side thereof to control the flow rate of hot water being supplied to the heat exchanger. Such flow control valve is previously mounted in the pipe, and this pipe thus having the flow control valve mounted therein is connected to a tank on the inlet side of the heat exchanger matrix after the heat exchanger matrix and the tank are put together.

Therefore, the conventional exchangers require a measure for joining the hot water inlet pipe with the flow control valve mounted therein, to the tank of the heat exchanger. Further, a sealing means is also necessary for prevention of leakage of hot water through the junction of the pipe and the tank. The design of the junction of the tank and the hot water inlet pipe including the joining and sealing measures involves problems such as the increase of the number of the heat exchanger parts, complicated construction, increased size, and consequent increase in the manufacturing cost.

Furthermore, the flow control valve of the above-mentioned kind is constructed such that to secure sealing between the valve body and the valve seat, the valve body is urged against its valve seat by the force of a spring, as disclosed in Japanese Utility Model Publication No. 52-54020 for instance. This construction involves a problem of low operatability. That is, not only the urging force of the spring but also the pressure of hot water in the hot water supply pipe acts upon the valve body, thus requiring a large operating force for actuating the valve body.

OBJECTS AND SUMMARY OF THE INVENTION

It is therefore an object of the invention to provide a heat exchanger in which a tank is formed integrally with a hot water inlet pipe, and a flow control valve is arranged at the junction of the tank and the pipe. The heat exchanger can be therefore simple in construction and compact in size.

It is a further object of the invention to provide a heat exchanger in which the valve body of the flow control valve which is rotatable about its own axis is seated against its valve seat substantially solely by the pressure of hot water flowing into the tank through the hot water inlet pipe, while securing fluidtightness between the valve body and the valve seat.

According to the invention, a tank of the heat exchanger, and a thermal medium fluid supply pipe (inlet pipe) are formed integrally with each other, at a junction or intersection of which is arranged a valve means for control of the flow rate of thermal medium fluid flowing into the tank through the supply pipe. The valve means comprises: a valve seat disposed at the junction of the tank and the pipe in a fashion traversing the flow of the thermal medium fluid, the valve seat having at least one through hole formed between a center and a periphery thereof; a valve body disposed in close contact with the valve seat for rotation about its own axis relative to the valve seat, the valve body having at least one through hole formed between a center and a periphery thereof at a position registrable with the at least one hole in the valve seat by rotation of the valve body; and a rotary shaft disposed to rotate the valve body. The flow rate of the thermal medium fluid passing through the through holes of the valve seat and the valve body varies in dependence on the registered area of the valve seat and the valve body. The valve body is located upstream of the valve seat in the flow of thermal medium fluid so that it is urged against the valve seat substantially solely by the pressure of thermal medium fluid flowing into the tank through the supply pipe.

These and other objects, features and advantages of the invention will become more apparent upon a reading of the following description and the accompanying drawings.

DETAILED DESCRIPTION

Figure 1:
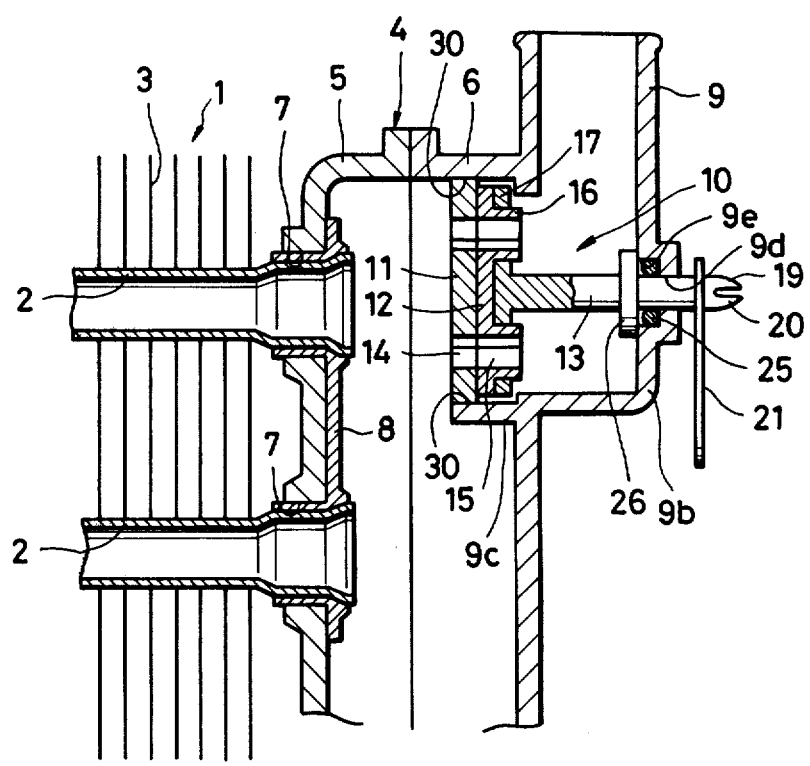
FIG. 1 is a vertical longitudinal view of an essential part of the heat exchanger according to a first embodiment of the invention.
Figure 2:
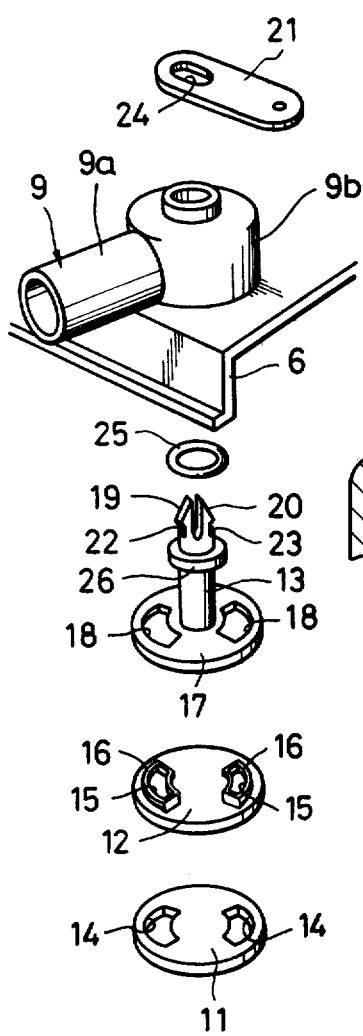
FIG. 2 is an exploded view in perspective of the flow control valve shown in FIG. 1.

Referrng now to the drawings, wherein like reference characters designate like or corresponding parts throughout, FIGS. 1 and 2 illustrate the heat exchanger according to a first embodiment of the invention. Reference number 1 designates a heat exchanger matrix in which a plurality of parallel tubes 2 which accommodate thermal medium fluid, e.g., hot water, flowing therein are horizontally disposed in a plurality of longitudinal rows (only one row is shown). The tubes in each row are arranged in vertically spaced relation to each other. A number of plate fins 3 are secured to these tubes 2 for carrying out heat exchange action in such a manner that the heat of hot water in the tubes is transmitted to the fins 3.

The tubes 2 have opposite ends thereof connected with two tanks 4 (only a tank on the inlet side is shown). The tank 4 on the inlet side comprises two tank elements 5, 6 which are made of synthetic resin and are joined with each other along peripheral edges thereof by means of friction welding by imparting an ultrasonic wave to the peripheral edges of the tank elements 5, 6 or an adhesive, etc. The inner tank element is formed therein with a corresponding number of through holes 7 to the number of tubes 2, through which holes extend the end portions of the tubes 2. A gasket 8 which is made of an elastic material is interposed between each hole 7 and each tube 2. The tubes 2 are secured to the tank 4 by expanding the end portions thereof. The outer tank element 6 is formed integrally with a hot water inlet pipe 9. The end portions of the pipe 9 on the side of the tank element 6 is formed of part of a main body 9a and a large-diameter portion 9b of the pipe 9 accomodating a flow control valve hereinafter referred to, which are molded in one body. This end portion of the pipe 9 has a free peripheral edge 9c cooperating with part of the inner peripheral wall of the tank element 6 to define a valve seat mounting hole 30 in the tank element 6. The tank element 6 may be formed integrally with a hot water outlet pipe (not shown). In such case, a partition wall (not shown) may be provided in the tank element 6 to define an inlet chamber and an outlet chamber therein such that hot water introduced into the inlet chamber through the inlet pipe 9 is guided through the tubes 2 in some predetermined rows into the tank at the other end of the heat exchanger matrix 1 and then is turned back into the outlet chamber through the tubes 2 in the other rows to be delivered out through the outlet pipe.

The hot water inlet pipe 9 is connected, through a hose not shown, with a water pump provided in an automotive engine for instance, to introduce into the tank 4 hot water heated by the engine and pumped by the water pump.

Provided at the junction of the tank 4 and the hot water inlet pipe 9 is a rotary type flow control valve 10 which comprises a valve seat 11, a valve body 12 and a rotary shaft 13. The valve seat 11 is formed of a disk member having two sectorial through holes 14, 14 arranged in relation symmetrical with respect to the center thereof. At the junction where the inlet pipe 9 is connected with the tank element 6, the valve seat 11 is disposed to traverse the flow of hot water from the inlet pipe 9 with a peripheral surface thereof secured to the inner peripheral surface of the valve seat mounting hole 30 by means of welding, press fit or the like.

The valve body 12 is also formed of a disk member having two sectorial through holes 15, 15 arranged in relation symmetrical with respect to the center thereof. The through holes 15, 15 of the valve body 12 are fringed with marginal axial protuberances 16, 16 on a side of the valve body 12 which axially protrude from the brims of the through holes 15, 15, while the other side of the valve body 12 is so flat that the valve body 12, which is situated upstream of the valve seat 11 in the flow of hot water, is disposed in rotatable contact with the valve seat 11. The rotary shaft 13, which is arranged to rotate the valve body 12 through its own rotation, carries a rotary disk member 17 secured to one end thereof and extending radially thereof. The disk member 17 is also formed therein with two sectorial through holes 18, 18 arranged in a diametrically symmetrical fashion. The marginal protuberances 16, 16 of the valve body 12 are snugly fitted in these through holes 18, 18 so that the rotation of the rotary shaft 14 is transmitted to the valve body through the disk member 17. Since the valve seat 11 and the valve body 12 each have two diametrically symmetrical sectorial through holes 14, 14, 15, 15 as stated above, the through holes 14, 14 and 15, 15 can register with each other with their registered areas varying as the valve body rotates, thus to regulate the flow rate of hot water flowing into the tank 4 through the inlet pipe 9.

The end portion of the rotary shaft 13 opposite to the end thereof facing the valve body 12 projects outwardly of the hot water inlet pipe 9 through a through hole 9d formed in the pipe 9 in the neighborhood of the junction of the pipe 9 and the tank 4. This end portion of the rotary shaft 13 has a tip portion thereof formed in two parts 19, 20 to allow an operating lever to be fitted thereon. An operating lever 21 is mounted on the parts 19, 20 in such a manner that the lever 21 has a through hole 24 engaged in grooves 22, 23 formed in lateral surfaces of the parts 19, 20, for transmitting a rotational control force to the rotary shaft.

A recess 9e is formed in an inner wall of the pipe 9 in the neighborhood of the junction of the pipe 9 and the tank 4 in a fashion encircling the through hole 9d, in which recess is received an O ring 25. Further, a collar 26 is formed on an intermediate portion of the rotary shaft 13 and is disposed in contact with the inner wall portion of the inlet pipe 9 surrounding the recess 9e, for prevention of leakage of hot water through the hole 9d.

With this arrangement, as the lever 21 is rotated in a desired direction, the rotary shaft 13 is rotated together with the lever 21 to vary the registered areas between the through holes 15, 15 of the valve body 12 and the through holes 14, 14 of the valve seat 11. Thus, by operating the lever 21, hot water can be allowed to flow into the tank 4 from the inlet pipe 9 at a controlled rate, and accordingly air having a desired temperature can be supplied from the heater exchanger.

During this operation, the hot water in the inlet pipe 9 has a pressure acting on the valve body 12 so that the valve body 12 and the valve seat 11 are kept in close contact with each other over the portions thereof other than the registered parts of the through holes 14, 14 and 15, 15, thus obtaining watertightness between the valve body 12 and the valve seat 11.

When the hot water in the hot water inlet pipe 9 is under no pressure, the valve body 12 undergoes no pressure, which permits the lever 21 to be operated with a very small operating force, and further lessens the possibility that the valve body 12 becomes unremovably stuck to the valve seat 11 after a long period of use as often seen in a conventional arrangement that a spring urges the valve body against the valve seat, thus eliminating the risk of damage to these valve elements.

Next, description will be made of the manner of mounting the flow control valve 10 having the above-described construction into the heat exchanger. The forked end portion of the rotary shaft 13 is inserted through the hole 9d from the inside of the inlet pipe 9, with the O ring 23 previously fitted on the rotary shaft 13. Then, the lever 21 is coupled to the lever fitting portion 19, 20. After this, the valve body 12 is coupled to the rotary shaft 13 by fitting the protuberances 16, 16 of the valve body 12 into the through holes 18, 18 of the rotary disk 17.

Then, the valve seat 11 is fitted into the inner surface of the valve seat hole 30 formed by the tank element 6 and the edge 9c of the pipe 9 by means of welding or press fit, thus completing the mounting of the flow control valve 10.

After the mounting of the flow control valve 10 is completed, the tank 4 is assembled by joining together the tank elements 5 and 6 by the aforementioned means.

Figure 3:
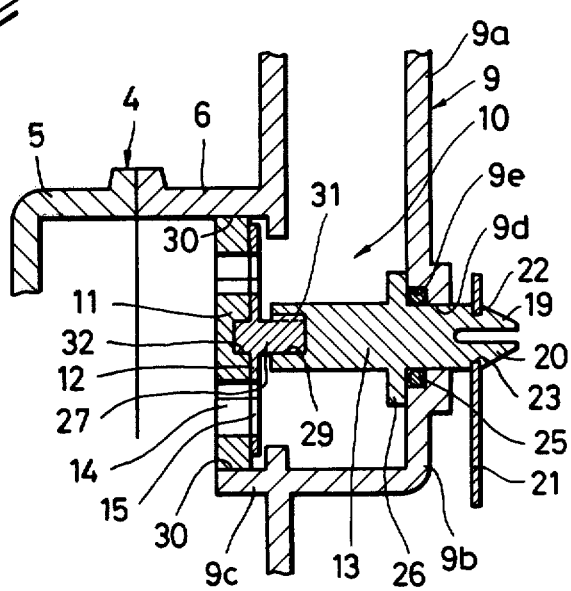
FIG. 3 is a vertical longitudinal view of an essential part of the heat exchanger according to a second embodiment of the invention.
Figure 4:
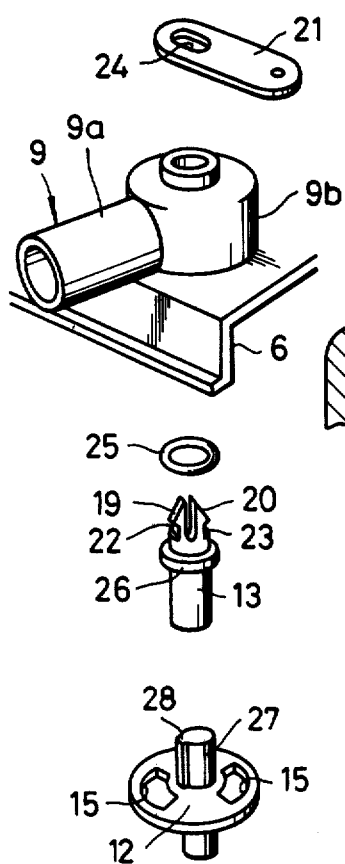
FIG. 4 is an exploded view in perspective of the flow control valve shown in FIG. 3.

FIGS. 3 and 4 illustrate a second embodiment of the invention. According to this embodiment, the flow control valve has a different construction than that according to the first embodiment in providing a further improved fluidtightness between the valve body 12 and the valve seat 11. More specifically, the valve body 12 has a smaller thickness such that it can be moderately deformed by the pressure of hot water flowing from the inlet pipe 9 into the tank 4 to be kept in close contact with the valve seat 11.

Further, a driven shaft 27 is integrally formed on the valve body 12 which penetrates the center of the valve body 12 with its opposite ends projecting from the opposite sides of the valve body 12. A longitudinal ridge 28 is formed on the portion of the driven shaft 27 projecting toward the rotary shaft 13. This portion of the driven shaft 27 is inserted in a blind bore 29 having a longitudinal channel 31 (indicated in dotted line in FIG. 3), which is formed in the end face of the rotary shaft 13 facing the valve body 12, with its ridge 28 engaged in the channel 31, to thus permit rotation of the driven shaft 27 in unison with the rotary shaft 13 while allowing axial displacement of the driven shaft 27 relative to the rotary shaft 13. While, the portion of the driven shaft 27 projecting toward the valve seat 11 is fitted in a blind bore 32 formed in the center of an opposed surface of the valve seat 11 for rotation relative thereto.

Thus, upon rotation of the rotary shaft 13, the valve body 12 correspondingly rotates about its own axis while it is kept in sliding contact with the valve seat 11.

Figure 5:
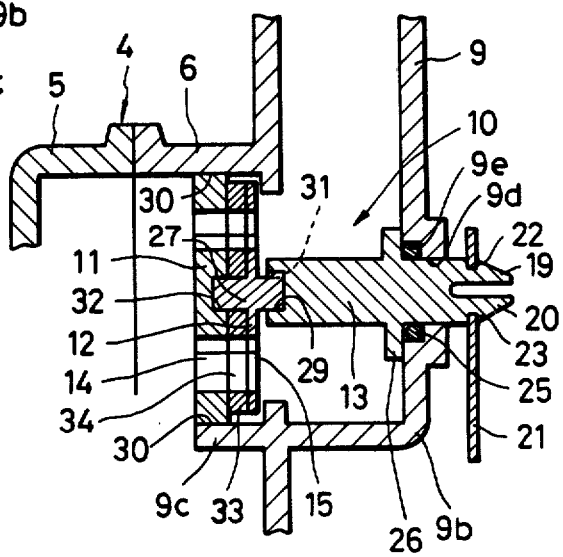
FIG. 5 is a vertical longitudinal view of an essential part of the heat exchanger according to a third embodiment of the invention.
Figure 6:
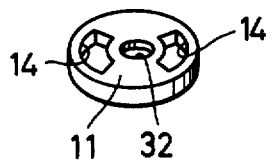
FIG. 6 is a perspective view of the sheet member shown in FIG. 5.
Figure 6:
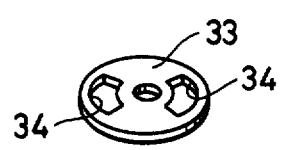

FIG. 5 illustrates a third embodiment of the invention. This embodiment is distinguished from the above-described second embodiment in that a sheet member 33 is interposed between the valve seat 11 and the valve body 12 to obtain a higher sealing effect. This sheet member 33, as shown in FIG. 6, has a disk-like shape and is made of an elastic material such as rubber. It also has two diametrically symmetrical through holes 34, 34 corresponding in shape and position to the through holes 14, 15 in the valve seat 11 and the valve body 12, and has a side surface thereof stuck on the valve seat 11 or the valve body 12 by means of an adhesive or coating to provide an improved liquidtightness between the valve seat 11 and the valve body 12.

In the embodiments described above, each two through holes 14, 15 and are formed in the valve body 12 and the valve seat 11, as noted above. However, this is not limitative in the invention, but each one or three or more through holes may be formed in these members (as well as in the sheet member 33 in the third embodiment) in relation registrable with each other.

It is to be understood that the foregoing description relates to preferred embodiments of the invention and that various changes and modifications may be made in the invention without departing from the spirit and scope thereof.

What is claimed is:
1. A heat exchanger which comprises:
a plurality of tubes;
a plurality of fins secured to said tubes;
a pair of tanks connected to opposite ends of said tubes;
an inlet pipe formed integrally with one of said tanks for introducing thermal medium fluid into said one tank; and
a valve means arranged at a junction of said one tank and said inlet pipe for controlling the flow rate of said thermal medium fluid flowing into said one tank through said inlet pipe;
said valve means comprising:
 a valve seat arranged at the junction of said one tank and said inlet pipe in a manner traversing the flow of said thermal medium fluid, said valve seat having at least one through hole formed between a center thereof and a periphery thereof;
 a valve body having an axis, said valve body being disposed in close contact with said valve seat for rotation about said axis of the valve body relative to said valve seat, said valve body having at least one through hole formed between a center thereof and a periphery thereof;
said at least one through hole of said valve seat being registrable with an associated one of said at least one through hole of said valve body, the registered area of said at least one through hole of said valve body and said associated through hole of said valve seat being variable as said valve body rotates to thereby vary the flow rate of said thermal medium fluid passing through said through holes;
said valve body comprising a thin deformable disk member which is deformable by the pressure of said thermal medium fluid in contact therewith, said valve body being located upstream of said valve seat in a flow passage of said thermal fluid formed in said inlet pipe, said valve body being deformed and urged against said valve seat substantially solely by the pressure of said thermal medium fluid flowing into said one tank through said inlet pipe;
a sheet member interposed between said valve body and said valve seat for keeping fluid tightness therebetween, said sheet member being secured to one of said valve seat and said valve body;
a rotary shaft arranged in said inlet pipe at a side of said valve body remote from said valve seat and operable from the outside of said heat exchanger, said rotary shaft having a recess formed in one end face thereof;
a single driven shaft integrally formed on said valve body, said single driven shaft being axially projected toward said rotary shaft and having an end inserted in said recess of said rotary shaft for rotation in unison therewith and being displaceable axially thereof;
an O-ring interposed between said rotary shaft and an inner wall of said inlet pipe;
said inlet pipe having a through hole formed therein in the neighborhood of the junction of the inlet pipe and said one tank;
a collar radially formed on an intermediate portion of said rotary shaft, said collar being placed in contact with said inner wall of said inlet pipe with said O-ring interposed between said collar and said inner wall of said inlet pipe; and
said rotary shaft having one end thereof projecting outwardly of said inlet pipe through said through hole of said inlet pipe such that said collar of said rotary shaft sealingly engages said inner wall of said inlet pipe with said O ring interposed between said collar and said inner wall of said inlet pipe.

2. The heat exchanger according to claim 1, wherein said single driven shaft penetrates a central portion of said valve body and projects on both sides of said valve body, and wherein said rotary shaft and said valve seat each have a blind bore formed in an end face thereof, said single driven shaft having one end thereof inserted in said blind bore of said rotary shaft and having the other end thereof rotatably fitted in said blind bore of said valve seat.

3. The heat exchanger according to claim 1, wherein said rotary shaft has a blind bore formed in an end face thereof, said single driven shaft of said valve body having one end thereof inserted in said blind bore of said rotary shaft.

4. The heat exchanger according to claim 1 wherein said sheet member has at least one through hole therein in registration with the at least one through hole of the one of said valve seat and valve body to which said sheet member is secured.

* * * * *